United States Patent
Makki et al.

(10) Patent No.: US 11,212,044 B2
(45) Date of Patent: Dec. 28, 2021

(54) DELAY AND COMPLEXIFY CONSTRAINED TRANSMISSION IN UPLINK NON-ORTHOGONAL MULTIPLE ACCESS (NOMA) HYBRID AUTOMATIC REPEAT REQUEST (HARQ)

(71) Applicant: Telefonaktiebolaget LM Ericsson (publ), Stockholm (SE)

(72) Inventors: Behrooz Makki, Gothenburg (SE); Ali Behravan, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 496 days.

(21) Appl. No.: 16/304,975

(22) PCT Filed: Oct. 23, 2018

(86) PCT No.: PCT/EP2018/078998
§ 371 (c)(1),
(2) Date: Nov. 27, 2018

(87) PCT Pub. No.: WO2020/083469
PCT Pub. Date: Apr. 30, 2020

(65) Prior Publication Data
US 2021/0226739 A1 Jul. 22, 2021

(51) Int. Cl.
*H04W 52/24* (2009.01)
*H04L 1/18* (2006.01)
*H04L 1/00* (2006.01)

(52) U.S. Cl.
CPC .......... *H04L 1/1854* (2013.01); *H04L 1/1835* (2013.01); *H04L 2001/0093* (2013.01)

(58) Field of Classification Search
CPC ........... H04W 52/243; H04W 72/0413; H04W 72/042; H04W 72/082; H04W 88/08;
(Continued)

(56) References Cited

U.S. PATENT DOCUMENTS 10,063,672 B2 * 8/2018 Kuo .................. H04L 1/0025
2009/0254790 A1 10/2009 Pi et al.
(Continued)

OTHER PUBLICATIONS

3GPP TR 36.866, V12.0.1, (Mar. 2014), 3rd Generation Partnership Project; Technical Specification Group Radio Access Network; Study on Network-Assisted Interference Cancellation and Suppression (NAIC) for LTE (Release 12), Mar. 2014, (64 pages).
(Continued)

*Primary Examiner* — Jung Liu
(74) *Attorney, Agent, or Firm* — Rothwell, Figg, Ernst & Manbeck, P.C.

(57) ABSTRACT

A method performed by a network node serving a first and second user equipment (UE). The method includes the network node receiving, during a first time slot, a first combined signal comprising a first message transmitted by the first UE and a second message transmitted by the second UE. The method also includes the network node attempting to decode the first message transmitted by the first UE. The method further includes the network node, as a result of failing to decode the first message transmitted by the first UE, transmitting a negative acknowledgement to the first and second UE without attempting to decode the second message.

8 Claims, 6 Drawing Sheets

(58) Field of Classification Search
CPC ... H04W 52/346; H04W 52/54; H04W 52/14; H04W 52/24; H04W 52/242; H04W 52/146; H04W 72/04; H04L 5/0091; H04L 1/00; H04L 5/0037; H04L 5/0053; H04L 5/0048; H04L 25/0328; H04L 25/03331; H04L 25/03305; H04L 5/0058; H04L 5/0055; H04L 5/00; H04J 11/00; H04J 13/16; H04B 1/707

See application file for complete search history.

(56) References Cited

U.S. PATENT DOCUMENTS

| | | | |
|---|---|---|---|
| 2014/0140451 A1 | 5/2014 | Callard et al. | |
| 2016/0100390 A1* | 4/2016 | Kuo | H04L 1/0009 370/329 |
| 2016/0219529 A1* | 7/2016 | Benjebbour | H04L 5/0091 |
| 2017/0257195 A1 | 9/2017 | Maaref | |
| 2017/0310417 A1* | 10/2017 | Jung | H04J 11/004 |
| 2018/0270829 A1* | 9/2018 | Matsumura | H04W 72/04 |
| 2019/0029031 A1* | 1/2019 | Kumar | H04W 28/0278 |
| 2019/0229957 A1* | 7/2019 | Lei | H04L 25/03942 |
| 2019/0327061 A1* | 10/2019 | Li | H04L 1/1812 |
| 2019/0349110 A1* | 11/2019 | Nammi | H04J 13/16 |
| 2020/0028611 A1* | 1/2020 | Lee | H04L 5/0042 |
| 2020/0053789 A1* | 2/2020 | Lee | H04W 74/004 |
| 2020/0106574 A1* | 4/2020 | Lee | H04L 1/0016 |

OTHER PUBLICATIONS

3GPP TSG RAN Meeting #67, RP-150496; Shanghai, China; Mar. 9-12, 2015; MediaTek Inc., "New SI Proposal: Study on Downlink Multiuser Superposition Transmission for LTE", (7 pages).
3GPP TSG RAN WG1 Meeting #86, R1-166056; Göteborg, Sweden; Aug. 22-26, 2016; MCC Support, "Final Report of 3GPP TSG RAN WG1 #85 v1.0.0", (170 pages).
Xu, Peng et al., "NOMA: An Information Theoretic Perspective", IEEE, arXiv:1504.07751v2 [cs.IT] May 12, 2015, (6 pages).
International Search Report issued in International Application No. PCT/EP2018/078998, dated Jul. 12, 2019 (5 pages).
Fraunhofer HHI et al., "On ARQ/HARO-related procedures for NOMA grant-free random access", 3GPP TSG-RAN WG1 Meeting #94Bis, R1-1811097, Chengdu, China Oct. 8-12, 2018 (4 pages).

* cited by examiner

DELAY AND COMPLEXIFY CONSTRAINED TRANSMISSION IN UPLINK NON-ORTHOGONAL MULTIPLE ACCESS (NOMA) HYBRID AUTOMATIC REPEAT REQUEST (HARQ)

CROSS REFERENCE TO RELATED APPLICATION(S)

This application is a 35 U.S.C. § 371 National Stage of International Patent Application No. PCT/EP2018/078998, filed Oct. 23, 2018, designating the United States.

TECHNICAL FIELD

Disclosed are embodiments related to non-orthogonal multiple access (NOMA) networks.

BACKGROUND

The design of multiple access schemes is of interest in the design of cellular telecommunication systems. The goal of multiple access schemes is to provide multiple user equipments (UEs) (i.e., wireless communication devices, such as, for example, smartphones, tablets, phablets, smart sensors, wireless Internet-of-Things (IoT) devices, etc., that are capable of wirelessly communicating with an access point) with radio resources in a spectrum, cost, and complexity-efficient manner. In 1G-3G wireless communication systems, frequency division multiple access (FDMA), time division multiple access (TDMA) and frequency division multiple access (CDMA) schemes have been introduced. Long-Term Evolution (LTE) and LTE-Advanced employ orthogonal frequency division multiple access (OFDMA) and single-carrier (SC)-FDMA as orthogonal multiple access (OMA) schemes. Such orthogonal designs have the benefit that there is no mutual interference among UEs, leading to high system performance with simple receivers.

Recently, non-orthogonal multiple access (NOMA) has received considerable attention as a promising multiple access technique for LTE and 5G systems. With NOMA, two or more UEs may share the same radio resources (e.g., time resources, frequency resources, and/or code resources). Particularly, 3GPP has considered NOMA in different applications. For instance, NOMA has been introduced as an extension of the network-assisted interference cancellation and suppression (NAICS) for intercell interference (ICI) mitigation in LTE Release 12 as well as a study item of LTE Release 13, under the name of "Downlink multiuser superposition transmission." Also, in recent 3GPP meetings, it is decided that new radio (NR) should target to support (at least) uplink NOMA, in addition to the OMA approach.

SUMMARY

NOMA outperforms OMA in terms of sum rate. This performance gain, however, comes at the cost of higher decoding delay and receiver complexity. In downlink NOMA, a "cell-center" UE (i.e., a UE having a relatively good channel quality) may be grouped (e.g., paired) with a "cell-edge" UE (i.e., a UE with a comparatively lower channel quality) and the cell-center UE may use successive interference cancellation (SIC) to first decode and remove the signal of the cell-edge UE and then decode its own signal free of interference. This two-step decoding process by the cell-center UE results in a larger end-to-end transmission delay for the cell-center UE. It also may lead to larger end-to-end delay for the cell-edge UE in cases where their signals need to be synchronized. NOMA-based data transmission also leads to higher receiver complexity compared to conventional OMA-based data transmission.

Certain embodiments disclosed herein provide an adaptive data transmission scheme in uplink NOMA-based systems using hybrid automatic repeat request (HARQ). The objective is to reduce the end-to-end packet transmission delay or, equivalently, increase the end-to-end throughput. The embodiments disclosed herein reduce the decoding complexity of the network node considerably.

For instance, in one aspect, a network node adapts its message decoding scheme and requests retransmissions with no additional message decoding depending on the message decoding status of the paired UEs. The network node also informs each UE about the adapted message decoding scheme, and the UEs synchronize each respective signal transmissions accordingly.

In another aspect there is provided a method performed by a network node, wherein the network node serves a first UE and a second UE. In one embodiment, the method includes the network node receiving, during a first time slot, a first combined signal comprising a first message transmitted by the first UE and a second message transmitted by the second UE. The method also includes the network node attempting to decode the first message transmitted by the first UE. The method further includes the network node, as a result of failing to decode the first message transmitted by the first UE, transmitting a negative acknowledgement to the first UE and the second UE without attempting to decode the second message.

In some embodiments, the method further includes the network node, as a result of failing to decode the first message transmitted by the first UE, buffering the second message transmitted by the second UE.

In some embodiments, the method further includes the network node, after transmitting the negative acknowledgement to the first UE and the second UE, receiving, during a second time slot, a second combined signal comprising the first message transmitted by the first UE and the second message transmitted by the second UE.

In some embodiments, the method further includes the network node attempting to decode the first message received during the second time slot. In some embodiments, the method further includes the network node, as a result of successfully decoding the first message received during the second time slot, removing the first message from the second combined signal to obtain the second message received during the second time slot. In some embodiments, the method further includes the network node attempting to decode the second message based on the obtained second message and/or the buffered second message.

Compared to the conventional NOMA techniques, the embodiments disclosed herein further reduce the end-to-end packet transmission delay of the network, thereby improving the network end-to-end throughput. Further, the embodiments disclosed herein further reduce the decoding complexity of the network node.

The embodiments disclosed herein may be applied to cases with arbitrary number of grouped UEs, different HARQ protocols, and different decoding schemes at the network node.

BRIEF DESCRIPTION OF THE DRAWINGS

The accompanying drawings, which are incorporated herein and form part of the specification, illustrate various embodiments.

DETAILED DESCRIPTION

Figure 1A:
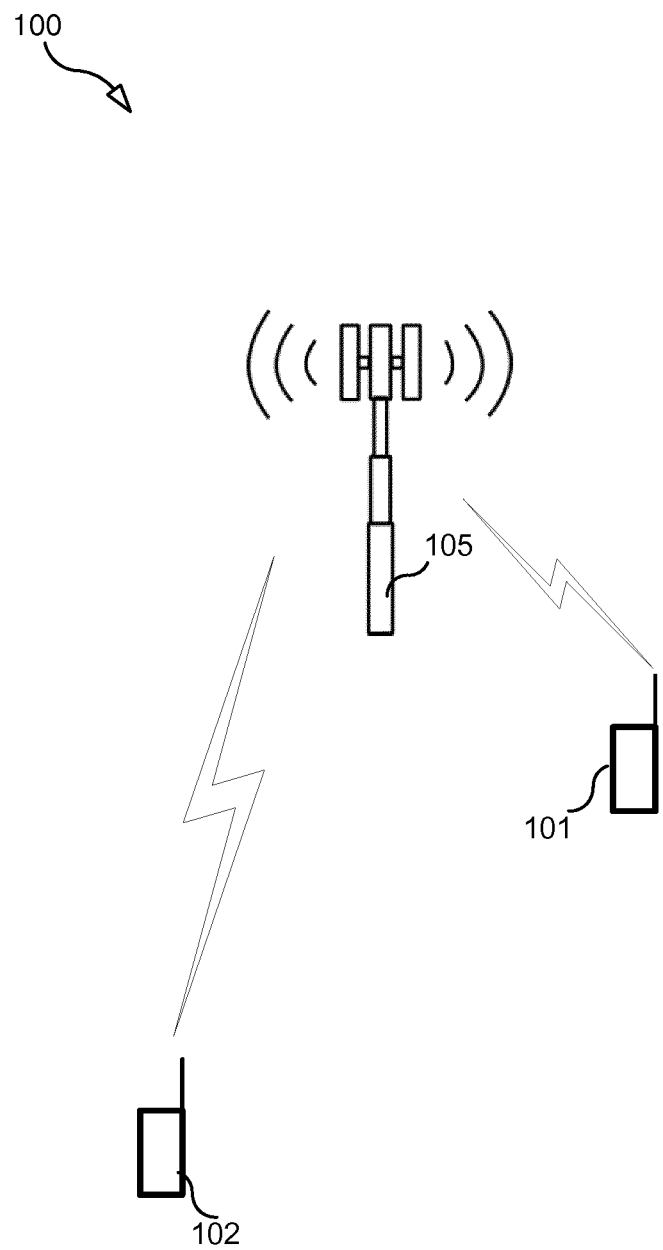
FIG. 1A illustrates a network node communicating simultaneously with a first UE and a second UE.

FIG. 1A illustrates a network 100 having a network node 105 (e.g., access point (AP) such as, for example, a 4G or 5G base station or other access point) serving a large number of UEs—e.g., UE 101, UE 102, etc. While only two UEs are shown, network node 105 may serve N number of UEs, where N>>2. The UEs communicate with the network node 105 using a limited number of spectrum resource blocks, i.e., time-frequency chunks.

Figure 1B:
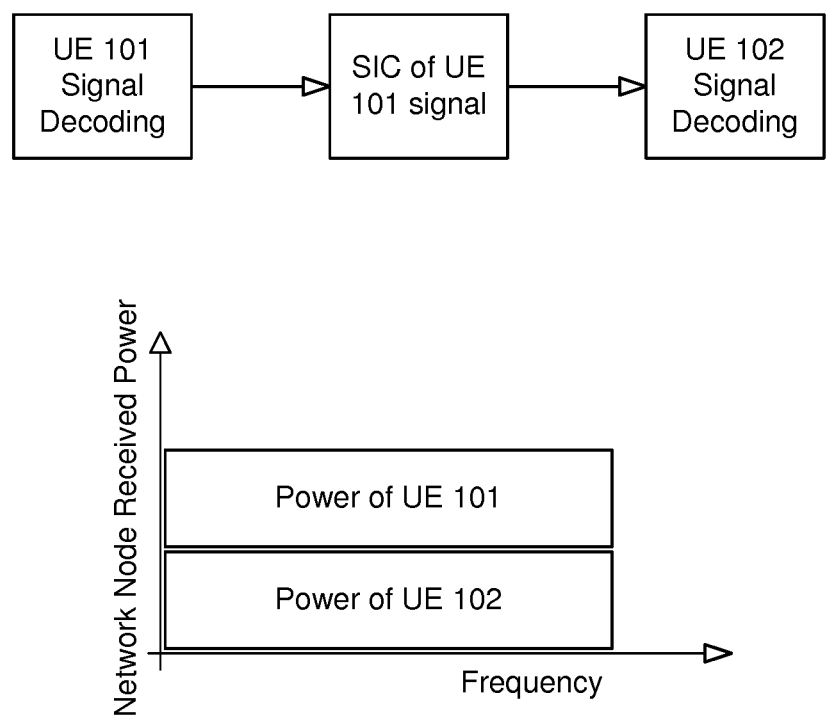
FIG. 1B illustrates processing performed by a network node according to one embodiment.

As shown in FIGS. 1A-B, the simplest case of an uplink scenario is considered, in which a cell-edge UE 102 and a cell-center UE 101, i.e. two UEs with different channel qualities, connected to the network node 105. With NOMA, UE 101 and UE 102 share the same spectrum and time resource to send each respective message simultaneously using the same frequency resources. Upon receiving the messages transmitted by UE 101 and UE 102, the network node 105 uses a SIC receiver to first decode the message of the cell-center UE 101, considering the signal of the cell-edge UE 102 as noise. After successfully decoding the UE 101 message, the network node 105 subtracts the signal of UE 101 from the received signal and decodes the UE 102 signal with no interference from UE 101.

Considering the transmission setup of FIGS. 1A-B, for example, the achievable rates of different UEs in the NOMA scheme are determined as:

$$\begin{cases} R_{1,NOMA} = \log_2\left(1 + \frac{P_1 g_1}{1 + P_2 g_2}\right)\left[\frac{bit}{symbol}\right] & (i) \\ R_{2,NOMA} = \log_2(1 + P_2 g_2) \cdot \left[\frac{bit}{symbol}\right] & (ii) \end{cases} \quad (1)$$

Here, $P_i$, i=101, 102, represents the transmission power of UE i, and $g_i$, i=101, 102, represents the channel gain between the i-th UE and the network node 105. Depending on the channel gains and power allocation, there may be various situations where NOMA-based data transmission increases the achievable rates for data transmission of each UE in addition to the network sum rate. However, NOMA-based data transmission leads to challenges such as:

(A) The relative performance gain of NOMA, compared to OMA, is at the cost of decoding delay, which may lead to even less end-to-end packet transmission delay/throughput, compared to OMA-based transmission. In the context of the present disclosure, end-to-end transmission delay is defined as the sum of data transmission duration, message decoding duration, and feedback delays.

(B) The sequential decoding scheme of SIC-based receivers leads to high decoding complexity at a network node. This may be due to the implementation complexity of NOMA, while NOMA is of most interest in dense networks with a large number of UEs requesting for access where there are not enough orthogonal resources to serve each UE in an OMA-based fashion. The receiver complexity of a network node may increase significantly in accordance with the number of paired UEs.

(C) The performance of a cell-edge UE depends on the successful message decoding probability of the cell-center UE. Referring to equation (1), the transmission rates/power of the cell-edge UE is adapted based on the assumption that a network node can successfully decode and remove a message of the cell-center UE. Accordingly, if the network node fails to decode the message of the cell-center UE, there is a high probability that the network node will be unable to decode the interference-affected signal of the cell-edge UE.

In order to overcome at least the above noted challenges, there is provided herein a proposed setup for the simplest case with two paired UEs, e.g., UE 101 and UE 102. The proposed setup may be applied for cases with any number of grouped UEs in other embodiments.

Figure 2:
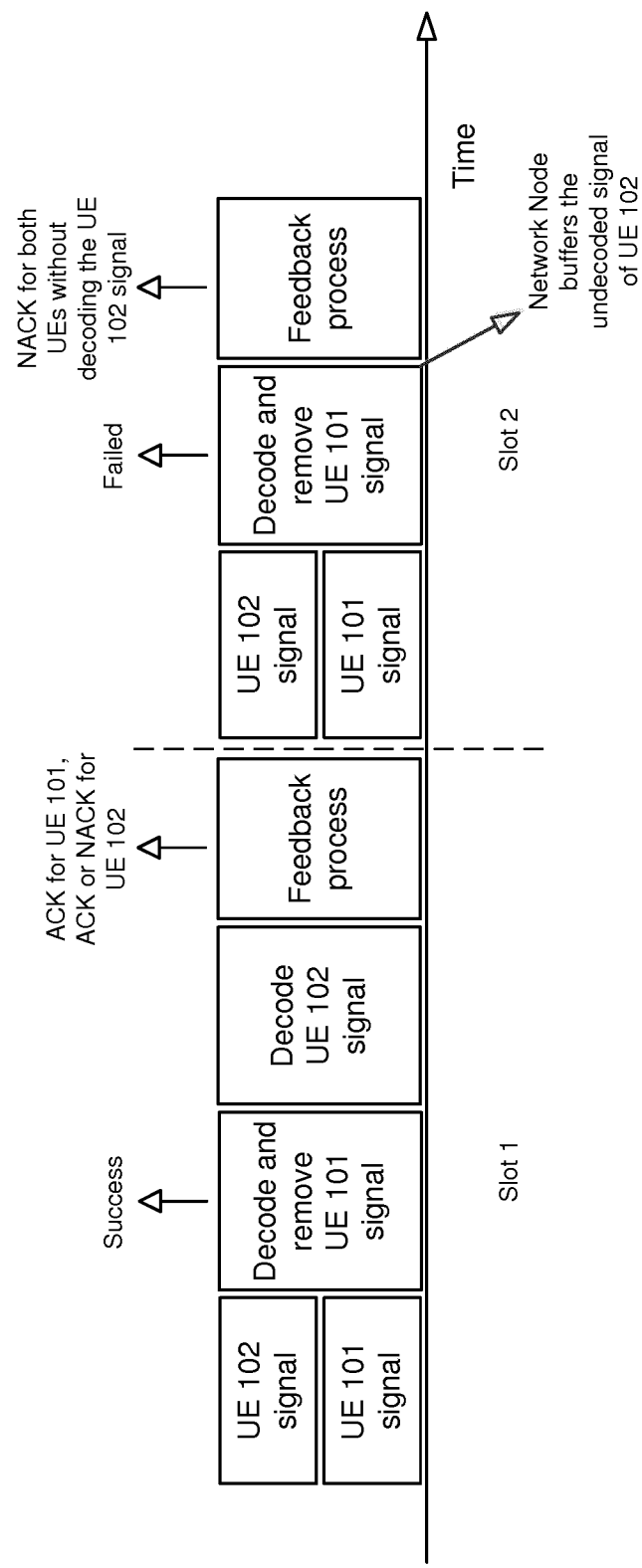
FIG. 2 illustrates NOMA setups according to some embodiments.

FIG. 2 illustrates NOMA setups according to some embodiments. As shown in FIG. 2, if the message of the cell-center UE 101 is correctly decoded in slot 1, the network node 105 continues in the SIC-based receiver scheme to first remove the signal of UE 101 and then decode the message of the cell-edge UE 102. In another instance, if the network node 105 fails to decode the message of cell-center UE 101 in slot 2, the network node 105 immediately sends negative acknowledgements (NACKs) to both UE 101 and UE 102 without attempting to decode the message of cell-edge UE 102. By sending NACKs to both UEs, both UEs will re-transmit their messages. In some embodiments, the network node 105 buffers the undecoded message of UE 102 for further processing in the next round of HARQ retransmissions in subsequent time slots. Depending on the message decoding status for the UEs at the network node 105, the data transmission for each of the UEs is synchronized for each time slot.

In considering the proposed setup illustrated in FIG. 2 and in the context of the current disclosure, the decoding delay of a codeword length L is defined as Γ(L). In some embodiments, Γ(L) is a function of encoding and decoding schemes. Additionally, in the context of the current disclosure, the total delay for feedback process is defined by D. In the proposed setup disclosed herein, the network node 105 first attempts to decode the message of UE 101, i.e., the cell-center UE. Then, the decoding scheme of the network node 105 and the synchronization of UE 101 and UE 102 are determined based on the message decoding status of UE 101 as shown in the following two scenarios:

Scenario 1: the network node 105 correctly decodes the message of UE 101. This first scenario is demonstrated in Slot 1 of FIG. 2. As shown in FIG. 2, the network node 105 utilizes the conventional SIC-based receiver to first remove the decoded message of UE 101 from the received signal and then decode the message of UE 102 free of interference generated by the UE 101 message. The network node 105 then sends an acknowledgement (ACK) for UE 101 and an ACK or negative-ACK (NACK) for UE 102, depending on message decoding status of UE 102. In this scenario, the total end-to-end packet transmission delay with codewords of length L is L+2Γ(L)+D. In some embodiments, the sleep mode period of the UEs is 2Γ(L)+D and, using the feedbacks received from the network node 105, the UEs may synchronize each respective message transmission accordingly.

Scenario 2: the network node 105 fails to correctly decode the message of UE 101. This second scenario is shown in Slot 2 of FIG. 2. In this scenario, the network node 105 sends NACKs to both UE 101 and UE 102 without attempting to decode the UE 102 message. In some embodiments, the UE 102 message is buffered for further processing in the subsequent retransmission rounds of the considered HARQ protocol. While NOMA transmission parameters (e.g., rate, power, etc.) of UE 102 are designed based on the assumption that the network node 105 can decode and remove the message of UE 101 and, as a result, the network node 105 decodes the message of UE 102 free of interference generated by the UE 101 message, the proposed setup of Scenario 2 considers instances in which the network node 105 fails to decode the message of UE 101. For example, with an unsuccessful decoding of the UE 101 message, the network node 105 attempts to decode the message of UE 102 with poor UE 102 and network node 105 link quality with the presence of the interfering signal of UE 101. In such instances, there is a high probability that the network node 105 fails to correctly decode the message of UE 102. Given the high probability of failure to decode the UE 102 message, it is not worth adding a $\Gamma(L)$ delay to the end-to-end packet transmission delay by attempting to decode the UE 102 message using the SIC-based receiver in such instances. Additionally, forgoing the attempt to decode the UE 102 message in the second step of the SIC-based receiver considerably reduces the implementation complexity of the network node 105. The proposed setup proposed in Scenario 2 reduces the end-to-end packet transmission delay to $L+\Gamma(L)+D(L)$, which is an improvement compared to the end-to-end packet transmission delay of Scenario 1. The UEs may synchronize each respective data transmission accordingly. In some embodiments, the decoding delay for a codeword of length L can be $\Gamma(L)=aL$, where $a \cong 3$. In such embodiments, the proposed setup described in Scenario 2 may considerably reduce the decoding delay.

While the embodiments disclosed in the current disclosure utilize the SIC-based decoding scheme, the proposed setup disclosed herein may be applied to alternative embodiments utilizing different decoding schemes. For example, for any NOMA-based decoding scheme, the network node may attempt the second decoding step of decoding the message of the cell-edge UE only if the message of the cell-center UE is correctly decoded. If the network node fails to correctly decode the message of the cell-center UE, the network node may buffer the undecoded cell-edge UE message and send NACKs to both UEs without attempting to decode the message of the cell-edge UE.

While the embodiments disclosed in the current disclosure describe two paired UEs connected to a network node, the proposed setup disclosed herein may be applied to alternative embodiments with arbitrary number of paired UEs. In some embodiments, there may be M paired UEs. In such embodiments, the network node may decode UE messages sequentially as long as each message is correctly decoded. Once the network node fails to decode the message of UE m, the network node may buffer the remaining undecoded signal and send NACKs to all subsequent UEs, e.g., UE m+1, . . . , UE M, without attempting to decode the remaining UE messages. As shown above in Scenario 2, the relative performance gain of the proposed scheme may increase with the number of paired UEs.

In some embodiments, the proposed setup disclosed herein may be applied for different HARQ schemes, such as, for example, incremental redundancy and chase combining.

While the embodiments disclosed in the current disclosure describe the proposed setup with reference to HARQ protocols where different copies of a signal retransmitted in different rounds of HARQ retransmission are used to decode the UE messages, the proposed setup disclosed herein may be applied to basic ARQ in some alternative embodiments. In ARQ, the receiver decodes the message in each retransmission round based only on the signal received in each respective round of retransmission. Accordingly, the only difference between the use of HARQ protocols and ARQ protocols may be that the network node does not need to buffer the previously undecoded messages in ARQ protocols.

While the embodiments disclosed in the current disclosure describe the proposed setup with the stop-and-wait HARQ scheme, the proposed setup disclosed herein may be applied in other HARQ schemes, e.g., selective repeat and go-back-N, in some alternative embodiments. The relative gain of reducing the end-to-end delay in such other HARQ schemes may be less than that in stop-and-wait HARQ scheme. However, the network node still benefits from reducing the implementation complexity and, as a result, energy efficiency of the network node may be improved.

Figure 3:
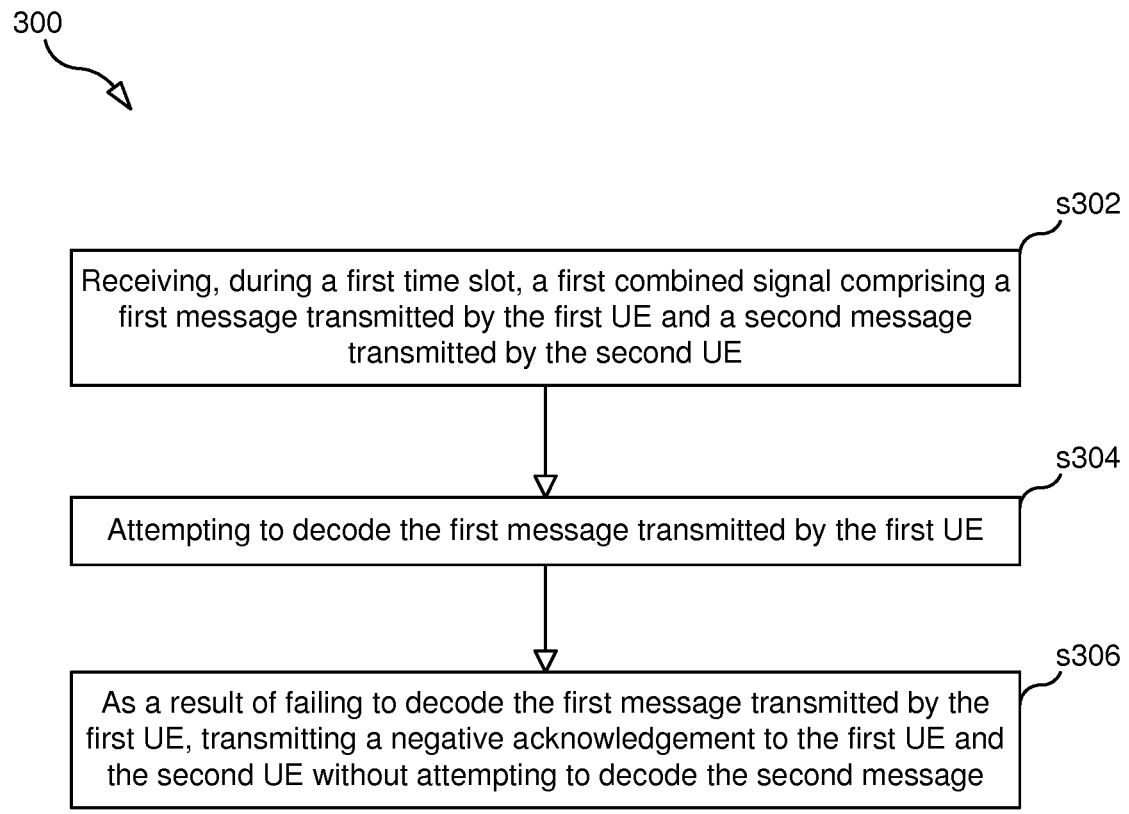
FIG. 3 is a flow chart illustrating a process according to one embodiment.

FIG. 3 is a flow chart illustrating a process 300, according to some embodiments, that is performed by a network node 105, wherein the network node serves a first UE (e.g., UE 101) and a second UE (e.g., UE 102). Process 300 may begin with step s302 in which network node 105 receives, during a first time slot, a first combined signal comprising a first message transmitted by the first UE and a second message transmitted by the second UE. In step s304, the network node attempts to decode the first message transmitted by the first UE. In step s306, the network node, as a result of failing to decode the first message transmitted by the first UE, transmits a negative acknowledgement to the first UE and the second UE without attempting to decode the second message.

In some embodiments, the process 300 includes a further step in which the network node, as a result of failing to decode the first message transmitted by the first UE, buffers the second message transmitted by the second UE.

In some embodiments, the process 300 includes a further step in which the network node, after transmitting the negative acknowledgement to the first UE and the second UE, receives, during a second time slot, a second combined signal comprising the first message transmitted by the first UE and the second message transmitted by the second UE.

In some embodiments, the process 300 includes a further step in which the network node attempts to decode the first message received during the second time slot. In some embodiments, the process 300 includes a further step in which the network node, as a result of successfully decoding the first message received during the second time slot, removes the first message from the second combined signal to obtain the second message received during the second time slot. In some embodiments, the process 300 includes a further step in which the network node attempts to decode the second message based on the obtained second message and/or the buffered second message.

Figure 4:
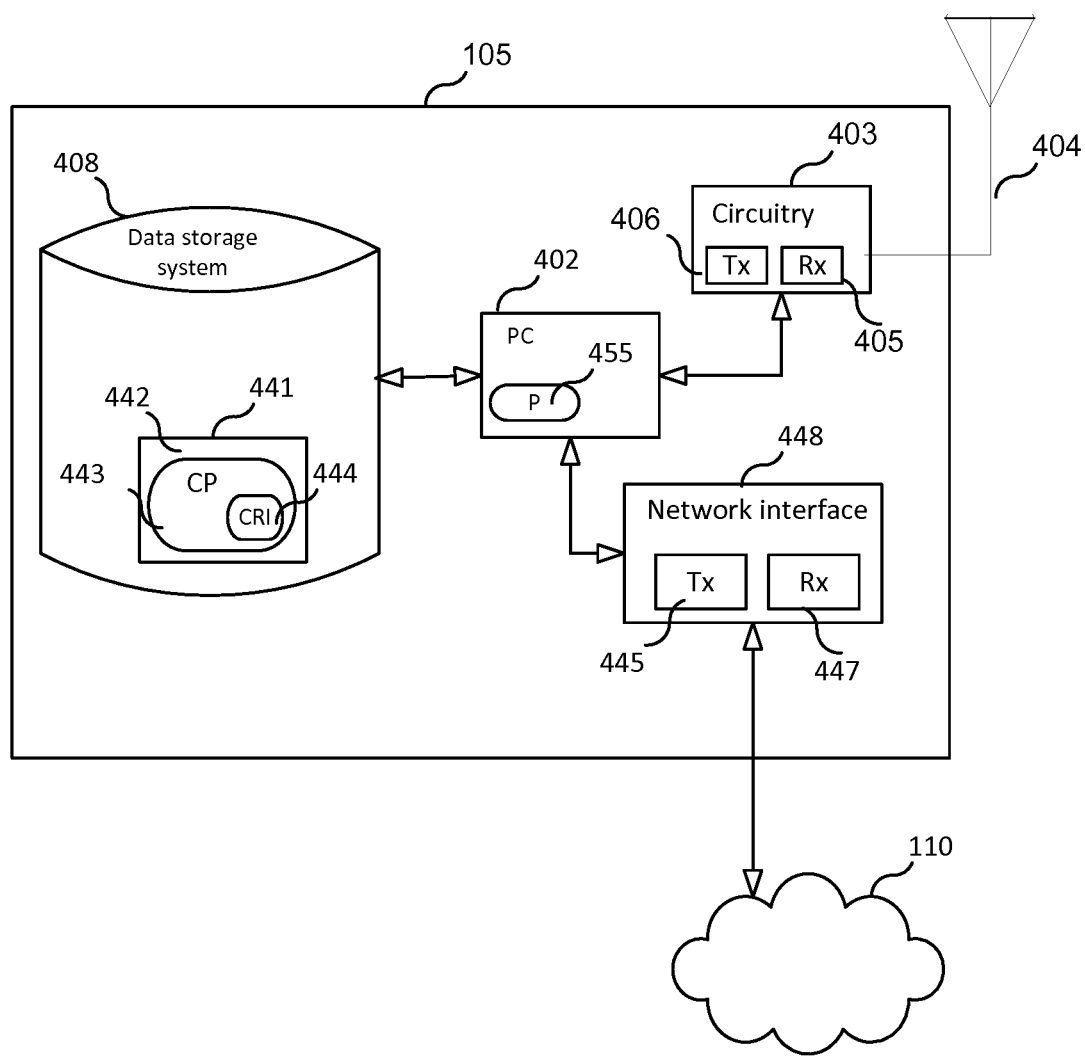
FIG. 4 is a block diagram of a network node according to one embodiment.

FIG. 4 is a block diagram of network node 105 according to some embodiments. As shown in FIG. 4, network node 105 may comprise: a processing circuit (PC) 402, which may include one or more processors (P) 455 (e.g., a general purpose microprocessor and/or one or more other processors, such as an application specific integrated circuit (ASIC), field-programmable gate arrays (FPGAs), and the like) which processors may be co-located or distributed across different locations; a network interface 448 comprising a transmitter (Tx) 445 and a receiver (Rx) 447 for enabling network node 105 to transmit data to and receive data from other nodes connected to a network 110 (e.g., an Internet Protocol (IP) network) to which network interface 448 is connected; circuitry 403 (e.g., radio transceiver circuitry comprising an Rx 405 and a Tx 406) coupled to an antenna system 404 for wireless communication with UEs); and local storage unit (a.k.a., "data storage system") 408, which may include one or more non-volatile storage devices and/or one or more volatile storage devices (e.g., random access memory (RAM)). In embodiments where PC 402 includes a programmable processor, a computer program product (CPP) 441 may be provided. CPP 441 includes a computer readable medium (CRM) 442 storing a computer program (CP) 443 comprising computer readable instructions (CRI) 444. CRM 442 may be a non-transitory computer readable medium, such as, but not limited, to magnetic media (e.g., a hard disk), optical media, memory devices (e.g., random access memory, flash memory), and the like. In some embodiments, the CRI 444 of computer program 443 is configured such that when executed by data processing apparatus 402, the CRI causes network node 105 to perform steps described herein (e.g., steps described herein with reference to the flow charts and/or message flow diagrams). In other embodiments, network node 105 may be configured to perform steps described herein without the need for code. That is, for example, PC 402 may consist merely of one or more ASICs. Hence, the features of the embodiments described herein may be implemented in hardware and/or software.

Figure 5:
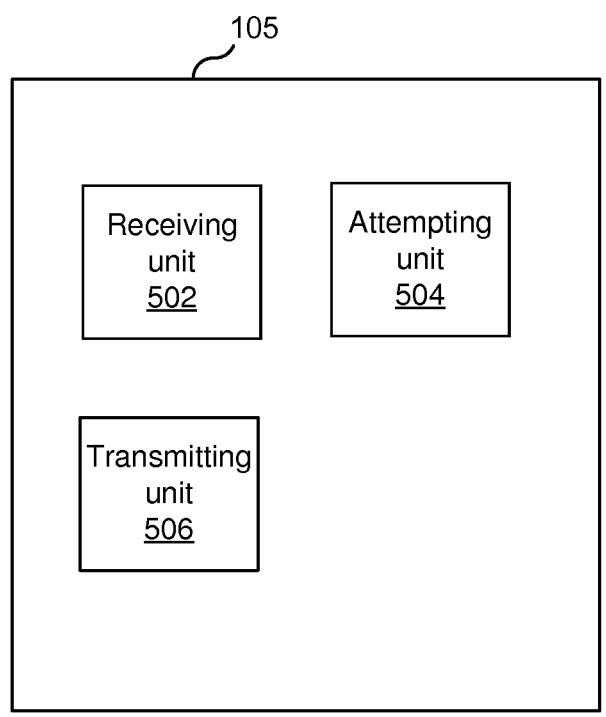
FIG. 5 is a diagram showing functional units of a network node according to one embodiment.

FIG. 5 is a diagram showing functional units of network node 105 according to some embodiments. As shown in FIG. 5, network node 105 includes a receiving unit 502 for receiving, during a first time slot, a first combined signal comprising a first message transmitted by the first UE and a second message transmitted by the second UE; an attempting unit 504 for attempting to decode the first message transmitted by the first UE; and a transmitting unit 506 for transmitting a negative acknowledgement to the first UE and the second UE without attempting to decode the second message as a result of failing to decode the first message transmitted by the first UE.

Also, while various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a network node serving a first user equipment, UE, and a second UE, the method comprising:

the network node receiving, during a first time slot, a first combined signal comprising a first message transmitted by the first UE and a second message transmitted by the second UE;

the network node attempting to decode the first message transmitted by the first UE;

as a result of failing to decode the first message transmitted by the first UE, the network node transmitting a negative acknowledgement to the first UE and the second UE without attempting to decode the second message; and after transmitting the negative acknowledgement to the first UE and the second UE, the network node receiving, during a second time slot, a second combined signal comprising the first message transmitted by the first UE and the second message transmitted by the second UE.

2. The method of claim 1, further comprising:

as a result of failing to decode the first message transmitted by the first UE, the network node buffering the second message transmitted by the second UE.

3. The method of claim 2, further comprising:

the network node attempting to decode the first message received during the second time slot;

as a result of successfully decoding the first message received during the second time slot, the network node removing the first message from the second combined signal to obtain the second message received during the second time slot; and the network node attempting to decode the second message based on the obtained second message and/or the buffered second message.

4. A network node serving a first user equipment, UE, and a second UE, the network node adapted to:

receive, during a first time slot, a first combined signal comprising a first message transmitted by the first UE and a second message transmitted by the second UE;

attempt to decode the first message transmitted by the first UE;

as a result of failing to decode the first message transmitted by the first UE, transmit a negative acknowledgement to the first UE and the second UE without attempting to decode the second message; and after transmitting the negative acknowledgement to the first UE and the second UE, receive, during a second time slot, a second combined signal comprising the first message transmitted by the first UE and the second message transmitted by the second UE.

5. The network node of claim 4, further adapted to:

as a result of failing to decode the first message transmitted by the first UE, buffer the second message transmitted by the second UE.

6. The network node of claim 5, further adapted to:

attempt to decode the first message received during the second time slot;

as a result of successfully decoding the first message received during the second time slot, remove the first message from the second combined signal to obtain the second message received during the second time slot; and attempt to decode the second message based on the obtained second message and/or the buffered second message.

7. A network node serving a first user equipment, UE, and a second UE, the network node comprising:

a receiving unit for receiving, during a first time slot, a first combined signal comprising a first message transmitted by the first UE and a second message transmitted by the second UE;

an attempting unit for attempting to decode the first message transmitted by the first UE;

a transmitting unit for transmitting a negative acknowledgement to the first UE and the second UE without attempting to decode the second message as a result of failing to decode the first message transmitted by the first UE; and a signal processor for processing a second combined signal comprising the first message transmitted by the first UE and the second message transmitted by the second UE, wherein the second combined signal is received after transmitting the negative acknowledgement to the first UE and the second UE.

8. A computer program product comprising a non-transitory computer readable medium storing a computer program comprising instructions which, when executed by processing circuitry of a network node, causes the network node to carry out the method of claim 1.

* * * * *